United States Patent Office 3,163,629
Patented Dec. 29, 1964

3,163,629
PROCESS OF OLEFIN POLYMERIZATION WITH A CATALYST CONTAINING AN ALLYL TIN COMPOUND, AN ORGANOALUMINUM COMPOUND AND TITANIUM TETRAHALIDE
Tsi T. Li, Milltown, N.J., assignor, by mesne assignments, to M & T Chemicals Inc., New York, N.Y., a corporation of Delaware
No Drawing. Filed July 19, 1960, Ser. No. 43,742
22 Claims. (Cl. 260—93.7)

This invention relates to novel organometallic compounds and to novel polymerization catalysts; to polymerization processes; and to novel products of said processes.

It is an object of this invention to provide a novel catalyst for the polymerization of ethylenically unsaturated monomers. It is another object of this invention to provide a novel polymerization process for the preparation of polyolefin materials. It is still another object of this invention to provide a novel polyethylene. It is also an object of this invention to provide a novel organoaluminum-tin compound.

I discovered that the reaction product of an allyltin compound and an organoaluminum compound together with a small amount of titanium tetrahalide is a superior catalyst for polymerizing olefins and other ethylenically unsaturated monomers. A preferred catalyst system is the reaction product of tetra-allyltin and triisobutylaluminum (or triethylaluminum) in a molar ratio of 3:4 in a solvent, to which is added about 2 moles of titanium tetrachloride per mole of the tin-aluminum reaction product, for polymerizing a wide range of ethylenically-unsaturated monomers. When ethylene is polymerized in the presence of this catalyst, a novel polyethylene is obtained.

The catalyst system contemplated herein is prepared from three components: (1) an allyltin compound, (2) an organoaluminum compound, and (3) a titanium tetrahalide. The allyltin compound has the general formula $A_nR_aSnX_{4-(n+a)}$; $n$ is 1, 2, 3, or 4; $a$ is 0, 1, 2, or 3; A is the allyl group, X is a halide, preferably chloride or bromide, and R is a hydrocarbon group selected from alkyls having 1 to 8 carbon atoms, and monocarbocyclic groups. Illustrative R groups include methyl, butyl, benzyl, octyl, cyclohexyl, and phenyl. The organoaluminum compound has the formula $R'_bAlX_{3-b}$; $b$ is 1, 2, or 3; X is a halide, preferably chloride or bromide; and R' is an alkyl group having 1 to 8 carbon atoms. Illustrative R' groups include methyl, butyl, hexyl, and ethyl. The branched chain groups such as isobutyl, isopropyl, 2-ethylhexyl are especially active. The titanium component of the catalyst system is titanium tetrachloride or such equivalent materials as titanium tetrabromide, the titanium esters, and the halides of the lower valent states of titanium such as titanium trichloride. The preferred titanium tetrachloride is used in a ratio of 0.3 to 10 moles per mole of the aluminum-tin product, and preferably 1 to 4.

Preferably the catalyst composition is prepared by first forming an organoaluminum-tin compound by reacting the allyltin compound and the organoaluminum compound. This reaction occurs when the two compounds are brought into contact with each other. The reaction is usually exothermic. Where one or both of the compounds are liquid, the reaction is easily carried out by mixing the liquids or mixing the solid into the liquid. Many of the reaction products have a characteristic yellowish coloration. The reaction is preferably carried out in an inert liquid vehicle. Where this is done, there is no need to separate the reaction products. The entire vehicle-product system may be used for polymerization directly.

Upon reaction of triphenylallyltin and tris-isobutylaluminum, a yellow product is formed and a gas evolved. The analysis for tin and aluminum shows a 1:1 ratio of tin and aluminum atoms. The evolved gas was identified as isobutylene. It is believed that one isobutyl group was cleaved from the aluminum atom and the aluminum then bonded to the 3-carbon of the allyl group of the tin molecule. The hydrogen from the isobutyl group attaches to the 2-carbon resulting in a compound which can be named 3-(di-isobutylaluminum)propyl triphenyltin. In a similar manner the remaining isobutyl groups can be cleaved by using more triphenylallyltin. When there is more than one allyl group attached to the tin, e.g., tetraallyltin, bridging and cross-linking occurs giving a highly complex product. Under such circumstances it is likely that some isobutyl groups remain unreacted even though an excess of allyltin is present. It has not been possible to isolate the reaction products because of the unstable nature of the aluminum-tin compounds. The tin aluminum ratio is such that ideally the proportion of the allyltin compound to the trialkyl aluminum compound is $3/Z$, where Z is the number of allyl groups bonded to the tin atom of the allyltin reactant compound. Where less than three alkyl groups per aluminum atom are present, the ratio will vary accordingly. When using tetraallyltin and a trialkylaluminum, the preferred molar ratio is 3 moles of the tin compound to 4 moles of the aluminum compound. More or less than this theoretical ratio may be utilized to form a catalyst. This is especially true where, as in the usual case, the catalyst is formed in situ and used for polymerization without further separation. The active catalyst system for polymerization is formed by the addition of the titanium tetrahalide to the reaction product of the allyltin and the organoaluminum compounds, forming a dark black or brownish precipitate. It is dispersed in an inert vehicle in the reaction medium. Preferable vehicles include such hydrocarbon solvents as pentane, octane, petroleum ether, gasoline fractions, cyclohexane, tetrahydronaphthalene, benzene, xylene, toluene, etc. The vehicle utilized should be inert to the reaction products as well as unreactive with the catalyst.

The polymerization process is generally similar to that in which other organometallic coordination-type catalysts are used. The novelty lies in the new catalyst system. Polymerization may be carried out at low pressures, even at atmospheric pressure. The catalyst is added to the reaction vessel, which is usually largely filled with solvent, and the monomer is bubbled into the vessel. Polymerization occurs immediately. The catalyst may be formed in situ.

The process is illustrated in terms of the preparation of polyethylene using tetraallyltin-isobutylaluminum with titanium tetrachloride as the catalyst. The yellowish solution of the reaction product of tetraallyltin and isobutylaluminum is added to the solvent-containing reaction vessel. A small amount of titanium tetrachloride is added immediately forming a dark precipitate which remains in solution in the form of a dispersion. The entire operation is carried out under nitrogen, usually with agitation. Ethylene is bubbled through the reaction vessel and immediately polymerizes. Although the catalyst system and the polymerization must be carried out under an inert atmosphere, preferably nitrogen which is most economical, the system is not so sensitive to oxygen impurities as are many of the other systems employing coordination-type catalysts. The process is also advantageous in that it may be carried out at ambient pressures. Atmospheric pressures have proved satisfactory for the polymerization of ethylene, propylene, butene, etc. It is also within the scope of this invention that higher pressures may be employed to obtain particularly desired results dependent upon the monomers utilized and the product desired.

After completion of polymerization, the products are separated from the reaction mixture and worked-up by conventional means. Usually they are washed with an organic solvent, such as one of the alcohols or ethers, followed by a dilute wash with an acid.

This catalyst system has been found to be operative with all olefins tested. The greatest interest is with those alpha olefins having up to five carbon atoms in the molecule, such as ethylene, propylene, butene, isobutylene, and such diolefins as butadiene and isoprene. Olefins having more than about ten carbon atoms in the molecule are not currently of interest for the preparation of polymers. Copolymers may also be prepared by utilizing my catalyst system. Of particular interest are ethylene copolymers in which the comonomer is an ethylenically-unsaturated hydrocarbon, such as copolymers of ethylene and propylene, ethylene and butadiene, ethylene and butene, and ethylene and propylene and butadiene, etc. Copolymers such as propylene with butene may also be prepared. My catalyst system is also effective for polymerizing ethylenically-unsaturated monomers other than those generally referred to as olefins or dienes. It is operative with such monomers as vinyl chloride, vinyl fluoride, styrene, etc. Due to the highly reactive nature of the catalyst, it is not operative with monomers having active functional groups such as acrylonitriles, acrylates, methylvinylketone, etc. From the nature of the catalyst, and the physical properties of the polyethylene prepared, it is believed that the polymers are stereospecifically oriented.

The polyethylene prepared using my novel catalyst has an unusually high melting point as compared to known polyethylenes. The melting point is in excess of 140° C., and usually between 145° and 155° C. The stiffness of this polyethylene is of the same general order as that reported for the high density polyethylenes. However, it has a far greater degree of flexibility, ultimate elongation, and a greater capacity to absorb impact. This combination of high tensile strength together with high elongation and high impact and flexural strength results in a unique and useful polyethylene. The density is in the order of 0.94. Polyethylene prepared as noted in Example 14 was tested to determine the physical properties generally used to evaluate plastic materials, with the following results:

TENSILE PROPERTIES

| Specimen | Yield Strength, p.s.i. (Drop of Baam) | Ultimate Tensile Strength, p.s.i. | Ultimate Elongation, percent | Modulus of Elasticity in Tension, p.s.i. |
| --- | --- | --- | --- | --- |
| 1 | 2,700 | 4,420 | 385 | 79,000 |
| 2 | 2,610 | 3,510 | 380 | 85,000 |
| 3 | 2,730 | 3,530 | 350 | 79,000 |
| 4 | 2,720 | 3,740 | 365 | 82,000 |
| 5 | 2,740 | 4,620 | 370 | 84,000 |
| Average | 2,700 | 3,960 | 370 | 82,000 |

FLEXURAL PROPERTIES

| Specimen | Flexural Strength, p.s.i.[1] | Modulus of Elasticity in Flexure, p.s.i. |
| --- | --- | --- |
| 1 | 3,130 | 78,000 |
| 2 | 3,020 | 79,000 |
| 3 | 3,250 | 91,000 |
| Average | 3,130 | 83,000 |

[1] The specimens did not break by the time the strain in the outer fiber had reached 0.05 inch per inch. Therefore, the flexural strength values reported are based on the stress obtained at this strain value.

[Izod impact strength, ft./lb./in. of notch]

| 1 | 2 | 3 | Average |
| --- | --- | --- | --- |
| 21.6 | 21.2 | 21.6 | 21.5 |

Tensile properties were determined in accordance with ASTM procedure D638 using type II specimens. The speed of the movable head of the testing machine was 2 inches per minute. Flexural properties were determined according to ASTM procedure D790–58T. Izod impact strength was determined in accordance with ASTM procedure D256–56 using four ply composite specimens.

For the purpose of giving those skilled in the art a better understanding of the invention, the following illustrative examples are given.

*Example 1.—Polymerization of Ethylene*

Triethylaluminum (5 ml.) and 8.5 g. of tetraallyltin were heated to 80° C. for one hour in 100 ml. of a heptane solvent, under a nitrogen atmosphere. The solution turned yellow. The reaction mixture was then cooled and 1 ml. of titanium tetrachloride was added. The solution turned black. Ethylene was then bubbled through the solution for a period of 10 hours. The temperature of the solution was maintained at 60°–70° C. The polymer formed from the ethylene was removed from the reaction mixture and washed with methanol and then dilute hydrochloric acid. It was dried under reduced pressure at 50° C. for 4 hours. 100 g. of a white polymer was obtained having a melting point between 145° and 150° C. and a density of 0.94.

*Example 2.—Polymerization of Ethylene*

Triphenylallyltin (1 g.) was heated with 1 ml. of triethylaluminum in 25 ml. of a heptane solvent at 70°–80° C. under a nitrogen atmosphere. 5 drops of titanium tetrachloride were added and a heavy dark brown precipitate formed. Ethylene was bubbled through the solution and polymerization occurred immediately. The polymer was washed with methanol and acetone, yielding 6 g. of a white solid having a melting point between 145° and 155° C.

*Example 3.—Polymerization of Butene-1*

Tetraallyltin (1.05 g.) was heated with 0.7 ml. of triethylaluminum in 30 ml. of a heptane solvent at 80°–90° C. for 1¼ hours. The solution turned a bright yellow. At the completion of the heating, it was cooled to 40° C. and 4 drops of titanium tetrachloride added. The mixture was then heated to 80°–90° C. and butene-1 bubbled into the solution. A solid poly-butene was obtained having a melting point of 130° C.

*Example 4.—Polymerization of Butadiene*

Tetraallyltin (2 g.) and 1 ml. of triethylaluminum were heated in 30 ml. of a heptane solvent at 80° C. under a nitrogen atmosphere for 1½ to 2 hours. It was then cooled and 10 drops of titanium tetrachloride added which resulted in the solution turning black. Butadiene was bubbled into the solution for 8 hours at the temperature of the Dry Ice bath. Solid polybutadiene was obtained.

Example 5.—Polymerization of Ethylene

Tetraallyltin (1.7 g.) was heated with 2 ml. of triisobutylaluminum under nitrogen. An exothermic reaction occurred immediately resulting in a yellow product. 30 ml. of a heptane solvent were added and the flask heated to 80° C. for ½ hour; cooled to 40° C. and 0.95 ml. of titanium tetrachloride added. The solution turned dark brown immediately. Ethylene was bubbled into the solution with immediate and very rapid polymerization. The polymer was recovered, washed in methanol, filtered and dried at reduced pressure.

Example 6.—Polymerization of Propylene

Tetraallyltin (1.7 g.) was added to 2 ml. of triisobutylaluminum under nitrogen. An exothermic reaction occurred immediately yielding a yellow material. 30 ml. of a heptane solvent were added and the material heated to 80°–90° C. for ½ to 1 hour. The solution was then cooled to 50°–60° C. and 0.95 ml. of titanium tetrachloride added; a brown precipitate formed immediately. Propylene was bubbled into the solution for 5 hours, followed by cooling and washing with methanol. A white solid polypropylene was obtained.

Example 7.—Polymerization of Butene-1

Using the same catalyst and the same procedure set forth in Example 6, and with the catalyst having a molar ratio of tetraallyltin:triisobutylaluminum:titanium tetrachloride of 3:4:2, butene-1 was bubbled into the solution for 6 hours and then cooled; the entire reaction product in solution being kept under nitrogen. Methanol was then added and the polymer separated and washed with methanol several times. A solid rubbery product was obtained which melted at 105° C.

Example 8.—Polymerization of Styrene

Triphenylallyltin (1.2 g.) and 0.5 ml. of triethylaluminum were mixed in 25 ml. of a heptane solvent under nitrogen atmosphere and heated to 80° C. 0.1 ml. of titanium tetrachloride was added followed by the addition of 15.6 g. of styrene. The reaction mixture was held at 80° C. for 8 hours. The product was then washed with acetone. 10 g. solid polymer were recovered.

Example 9.—Polymerization of Ethylene

Tetraallyltin (1.4 g.) and 1.3 g. of tin tetrachloride were mixed under nitrogen to form a precipitate which was immediately dissolved in 20 ml. of a heptane solvent and heated to 80° C. for ½ hour to form a reaction product containing diallyltin dichloride. This was cooled to 40° C. and 3.5 ml. of triisobutylaluminum added, resulting in an exothermic reaction with the evolution of gas. Additional heptane solvent was added and the reaction heated to 70°–80° C. for ½ hour. The reaction mixture was cooled and 0.45 ml. of titanium tetrachloride added, resulting in an immediate formation of a brown precipitate. Ethylene was bubbled into the solution for 2½ hours. A polymer was formed which was separated by washing with methanol and dilute hydrochloric acid.

Example 10.—Polymerization of Vinyl Chloride

Tetraallyltin (1.7 g.) was mixed with 2 ml. of triisobutylaluminum under nitrogen. The reaction was exothermic and the resultant yellow liquid was added to 20 ml. of heptane and heated to 70°–80° C. for 1½ hours, followed by cooling to 40° C. and the addition of 0.45 titanium tetrachloride. The mole ratio of tetraallyltin:isobutylaluminum:titanium tetrachloride was 3:4:2. Vinyl chloride was bubbled into the solution for 3 hours while the temperature was maintained at 70–80° C. A white solid polymer was separated by washing the solution with methanol.

Example 11.—Polymerization of Ethylene

Diallyldibutyltin (3.12 g.) was mixed with 1.7 ml. of triisobutylaluminum under nitrogen, followed by the addition of 20 ml. of heptane solvent. The solution was then heated to 80°–90° C. for 2 hours. The solution remained colorless. It was then cooled and 8–9 drops titanium tetrachloride added, resulting in an immediate black precipitate. 20 ml. of heptane solvent were added, followed by passage of ethylene gas into the solution for 4 hours. Polyethylene was separated from the reaction mixture.

Example 12.—Polymerization of Ethylene

Tetraallyltin (1.4 g.) was mixed with 1.25 ml. of diethylaluminum chloride under nitrogen. The reaction was exothermic resulting in a gray solid precipitate. 20 ml. of heptane solvent were added and the vessel heated to 80° C. for ½ hour; cooled to 50° C., followed by the addition of 0.55 ml. of titanium tetrachloride. A brown precipitate formed immediately. Ethylene was bubbled into the solution for 5 hours while the temperature was held at 70–80° C. A solid polymer was separated from the reaction mixture. Similar results will be achieved using the reaction mixture. Similar results will be achieved using diethylaluminum bromide in place of the chloride.

Example 13

A solution of 31.3 g. of allyltriphenyltin (0.08 mole) in 40 ml. octane was added to 15.8 g. triisobutylaluminum (0.08 mole) dissolved in 20 ml. octane. The solution was heated slowly under nitrogen to 100° and stirred at 100° for 2½ hours. A white precipitate formed in the reaction mixture during this heating. Isobutylene was formed in the reaction and was condensed in a Dry-Ice-solvent trap in 71% yield. The solvent was distilled off and the pressure was dropped to 0.1 mm. while the temperature was raised to 100°. Only a few drops of material distilled over in this range, indicating complete reaction of the triisobutylaluminum (B.P.=50°/0.95 mm.). A white, tacky residue was left in the flask. This material warmed up rapidly when exposed to air and reacted violently with water. Analysis of the product for metals showed an atomic ratio: Sn/Al=1.1. The calculated ratio is 1.0.

Example 14.—Polymerization of Ethylene

Triethylaluminum (4.2 ml.) and 6.3 g. of tetraallyltin were mixed in a flask under nitrogen. 40 ml. of a heptane solvent (Esso-Solvent 210) were added and the solution heated to 80° C. for 2 hours. The solution was then diluted with 400 additional milliliters of the solvent, followed by the addition of 0.85 ml. of titanium tetrachloride which resulted in the immediate formation of a black precipitate. Ethylene was bubbled into the solution for 6 hours while the temperature was maintained at 80° C. The system was then stopped for the night and allowed to cool under nitrogen. The next morning the solution was reheated to 80° C. and another 100 mls. of the solvent added. Ethylene was bubbled into the solution for 7 hours. This procedure was repeated a third day. Polyethylene product obtained was washed with methanol several times and dried at reduced pressure. It had a melting point between 145° and 150° C. The polyethylene produced was mixed with other similarly prepared samples and molded to a ⅛″ x 6″ x 6″ sheet at 177° C. and under 30,000–40,000 p.s.i. for 15 minutes. The sheet was cut into pellets which were molded and the physical properties determined.

The novel organoaluminum-tin compounds prepared from allyltin compounds are generally more active when combined with the titanium tetrachloride than are catalyst compositions prepared from trialkylaluminum compounds and the titanium tetrachloride. They are also advantageous in that they have been found to be less sensitive to oxygen and other impurities. They are far less pyrophoric in nature, some even to the point of not being classified as pyrophoric materials. The activity of the catalyst system is such that it is possible to interrupt polymerization, cool the reaction mixture, and then start up again only by heating and adding the monomers. This is an important manufacturing advantage over other coordination-type catalysts which frequently are not useful once the polymerization has been interrupted.

As many embodiments of the invention may be made without departing from the spirit and scope thereof, it is to be understood that the invention includes all such modifications and variations as come within the scope of the appended claims.

I claim:

1. A catalyst composition comprising the product obtained on admixing in an inert hydrocarbon solvent (i) the reaction product of an allyltin compound having the formula $A_nR_aSnX_{4-(n+a)}$ wherein A is the allyl group, R is a hydrocarbon group selected from the class consisting of alkyls having 1 to 8 carbon atoms and monocyclic groups, $n$ is a whole number from 1 to 4, and $a$ is a whole number from 0 to 3, $n+a$ equals 1–4, and X is selected from the group consisting of chloride and bromide and an organoaluminum compound having the formula $R'_bAlCl_{3-b}$ wherein R' is an alkyl group having 1 to 8 carbon atoms and $b$ is a whole number from 1 to 3, with (ii) titanium tetrachloride, in a ratio of 0.3 to 10 moles of the titanium tetrahalide per mole of the aluminum-tin reaction product.

2. The catalyst composition of claim 1 in which said ratio is 1 to 4.

3. The catalyst composition comprising the product obtained on admixing in an inert hydrocarbon solvent (i) the reaction product of tetraallyltin and an organoaluminum compound having the formula $R'_bAlCl_{3-b}$ wherein R' is an alkyl group having 1 to 8 carbon atoms and $b$ is a whole number from 1 to 3, with (ii) titanium tetrachloride, in a ratio of 0.3 to 10 moles of the titanium tetrahalide per mole of the aluminum-tin reaction product.

4. The catalyst composition of claim 3 in which R' is the ethyl group and in which said ratio is about 2.

5. The catalyst composition comprising the product obtained on admixing in an inert hydrocarbon solvent (i) the reaction product of tetraallyltin and an organoaluminum compound having the formula $R'_3Al$ wherein R' is a branched chain alkyl group having up to 8 carbon atoms, with (ii) titanium tetrachloride, in a ratio of 0.3 to 10 moles of the titanium tetrahalide per mole of the aluminum-tin reaction product.

6. The catalyst composition of claim 5 in which the hydrocarbon group R' is the isobutyl group, and in which said ratio is about 2.

7. The process for polymerizing olefins which comprises introducing at least one olefin into an inert hydrocarbon solvent containing, as a catalyst composition, the product obtained on admixing in an inert hydrocarbon solvent (i) the reaction product of an allyltin compound having the formula $A_nR_aSnCl_{4-(n+a)}$ wherein A is the allyl group, R is a hydrocarbon group selected from the class consisting of alkyls having 1 to 8 carbon atoms and monocyclic groups, $n$ is a whole number from 1 to 4, and $a$ is a whole number from 0 to 3, and $n+a$ equals 1–4 and an organoaluminum compound having the formula $R'_bAlCl_{3-b}$ wherein R' is an alkyl group having 1 to 8 carbon atoms and $b$ is a whole number from 1 to 3, with (ii) titanium tetrachloride, in a ratio of 0.3 to 10 moles of the titanium tetrahalide per mole of the aluminum-tin reaction product.

8. The process for polymerizing olefins which comprises introducing at least one olefin into an inert hydrocarbon solvent containing, as a catalyst composition, the product obtained on admixing in an inert hydrocarbon solvent (i) the reaction product of tetraallyltin and an organoaluminum compound having the formula $R'_3Al$ wherein R' is a branched chain alkyl group having up to 8 carbon atoms with (ii) titanium tetrachloride, in a ratio of 0.3 to 10 moles of the titanium tetrahalide per mole of the aluminum-tin reaction product.

9. The polymerization process which comprises introducing one or more ethylenically-unsaturated monomers selected from the class consisting of ethylene, propylene, butene, isobutene, butadiene, isoprene, vinyl chloride, and styrene into an inert hydrocarbon solvent containing, as a catalyst composition, the product obtained on admixing in an inert hydrocarbon solvent (i) the reaction product of tetraallyltin and a trialkyl aluminum wherein the alkyl group has 1 to 8 carbon atoms, with (ii) titanium tetrachloride, in a ratio of 0.3 to 10 moles of the titanium tetrahalide per mole of the aluminum-tin reaction product.

10. The process of claim 9 in which the olefin is ethylene.

11. The process of claim 9 in which the olefin is propylene.

12. The reaction product prepared by reacting an allyltin compound having the formula $A_nR_aSnX_{4-(n+a)}$ wherein A is the allyl group, R is a hydrocarbon group selected from the class consisting of alkyls having 1 to 8 carbon atoms and monocyclic groups, X is a halide selected from the class consisting of chloride and bromide, $n$ is a whole number from 1 to 4, and $a$ is a whole number from 0 to 3, and $n+a$ equals 1–4 with an organoaluminum compound having the formula $R'_bAlX_{3-b}$ wherein R' is an alkyl group having 1 to 8 carbon atoms and $b$ is a whole number from 1 to 3.

13. The reaction product prepared by reacting in an inert hydrocarbon solvent an allyltin compound having the formula $A_nR_aSnX_{4-(n+a)}$ wherein A is the allyl group, R is a hydrocarbon group selected from the class consisting of alkyls having 1 to 8 carbon atoms and monocyclic groups X is a halide selected from the class consisting of chloride and bromide, $n$ is a whole number from 1 to 4, and $a$ is a whole number from 0 to 3, and $n+a$ equal 1–4 with an organoaluminum compound having the formula $R'_bAlX_{3-b}$ wherein R' is an alkyl group having 1 to 8 carbon atoms and $b$ is a whole number from 1 to 3.

14. The reaction product prepared by reacting tetraallyltin with a trialylaluminum compound having up to 8 carbon atoms in each alkyl substituent, in a molar ratio of about 3 tetraallyltin to 4 of trialkylaluminum.

15. The reaction product prepared by reacting tetraallyltin with triethylaluminum, in a molar ratio of about 3 to 4.

16. The reaction product prepared by reacting tetraallyltin with triisobutylaluminum, in a molar ratio of about 3 to 4.

17. The reaction product prepared by reacting tetraallyltin with triisopropylaluminum, in a molar ratio of about 3 to 4.

18. The reaction product prepared by reacting tetraallyltin with triisooctylaluminum, in a molar ratio of about 3 to 4.

19. The reaction product prepared by reacting triphenylallyltin with triisobutylaluminum, in a molar ratio of about 3 to 1.

20. The reaction product prepared by reacting dibutyldiallyltin with triisobutylaluminum, in a molar ratio of about 3 to 2.

21. A catalyst composition comprising the product obtained on admixing in an inert hydrocarbon solvent (i) the reaction product of an allyltin compound having the formula $A_nR_aSnX_{4-(n+a)}$ wherein A is the allyl group, R is a hydrocarbon group selected from the class consisting of alkyls having 1 to 8 carbon atoms and monocyclic groups, $n$ is a whole number from 1 to 4, $a$ is a whole number from 0 to 3, $n+a$ equals 1–4, and X is selected from the group consisting of chloride and bromide; and an organoaluminum compound having the formula $R'_bAlX_{3-b}$ wherein R' is an alkyl group having 1 to 8 carbon atoms and $b$ is a whole number from 1 to 3; with (ii) a titanium compound selected from the group consisting of titanium tetrachloride, titanium tetrabromide, titanium esters, and titanium trichloride, in a ratio of 0.3 to 10 moles of the titanium compound per mole of the aluminum-tin reaction product.

22. The process for polymerizing olefins which comprises introducing at least one olefin into an inert hydrocarbon solvent containing, as a catalyst composition, the product obtained on admixing in an inert hydrocarbon solvent (i) the reaction product of an allyltin compound having the formula $A_nR_aSn_{4-(n+a)}$ wherein A is the allyl group, R is a hydrocarbon group selected from the class consisting of alkyls having 1 to 8 carbon atoms and monocyclic groups, X is selected from the group consisting of chloride and bromide, $n$ is a whole number from 1 to 4, $a$ is a whole number from 0 to 3, and $n+a$ equal 1–4; and an organoaluminum compound having the formula $R'_bAlX_{3-b}$ wherein R' is an alkyl group having 1 to 8 carbon atoms and $b$ is a whole number from 1 to 3, with (ii) a titanium compound selected from the group consisting of titanium tetrachloride, titanium tetrabromide, titanium esters, and titanium trichloride, in a ratio of 0.3 to 10 moles of the titanium compound per mole of the aluminum-tin reaction product.

References Cited in the file of this patent

UNITED STATES PATENTS

| | | |
|---|---|---|
| 2,867,612 | Pieper et al. | Jan. 6, 1959 |
| 3,085,120 | Seyferth et al. | Apr. 9, 1963 |

FOREIGN PATENTS

| | | |
|---|---|---|
| 813,905 | Great Britain | May 27, 1959 |

OTHER REFERENCES

J. Inorg. Nucl. Chem., 1958, vol. 6, pages 134–137.